Figure 2B:
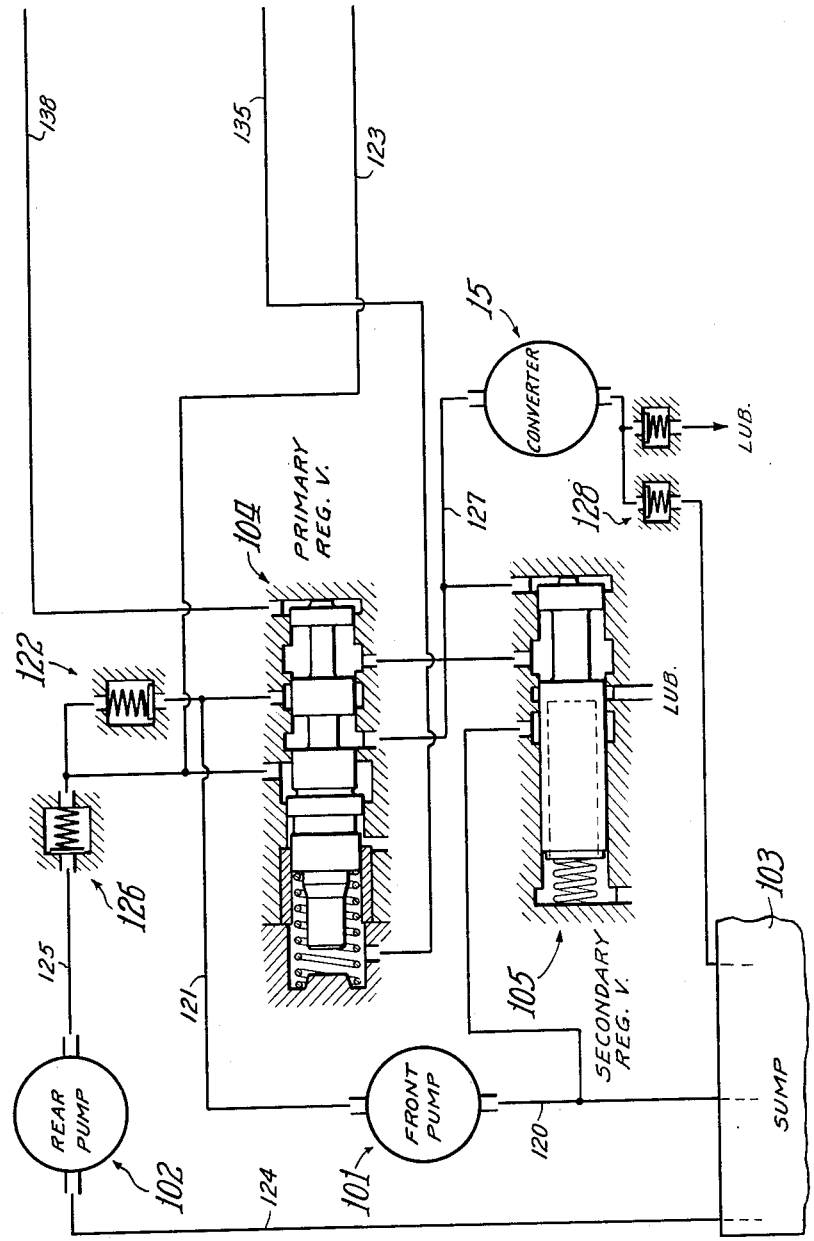

June 9, 1964  J. S. IVEY  3,136,175

TRANSMISSION CONTROLS

Filed Sept. 18, 1961  4 Sheets-Sheet 1

Inventor:
John S. Ivey
By: Ray E. Snyder  Atty.

June 9, 1964  J. S. IVEY  3,136,175
TRANSMISSION CONTROLS
Filed Sept. 18, 1961  4 Sheets-Sheet 2

Inventor:
John S. Ivey
By: Ray E. Snyder Atty.

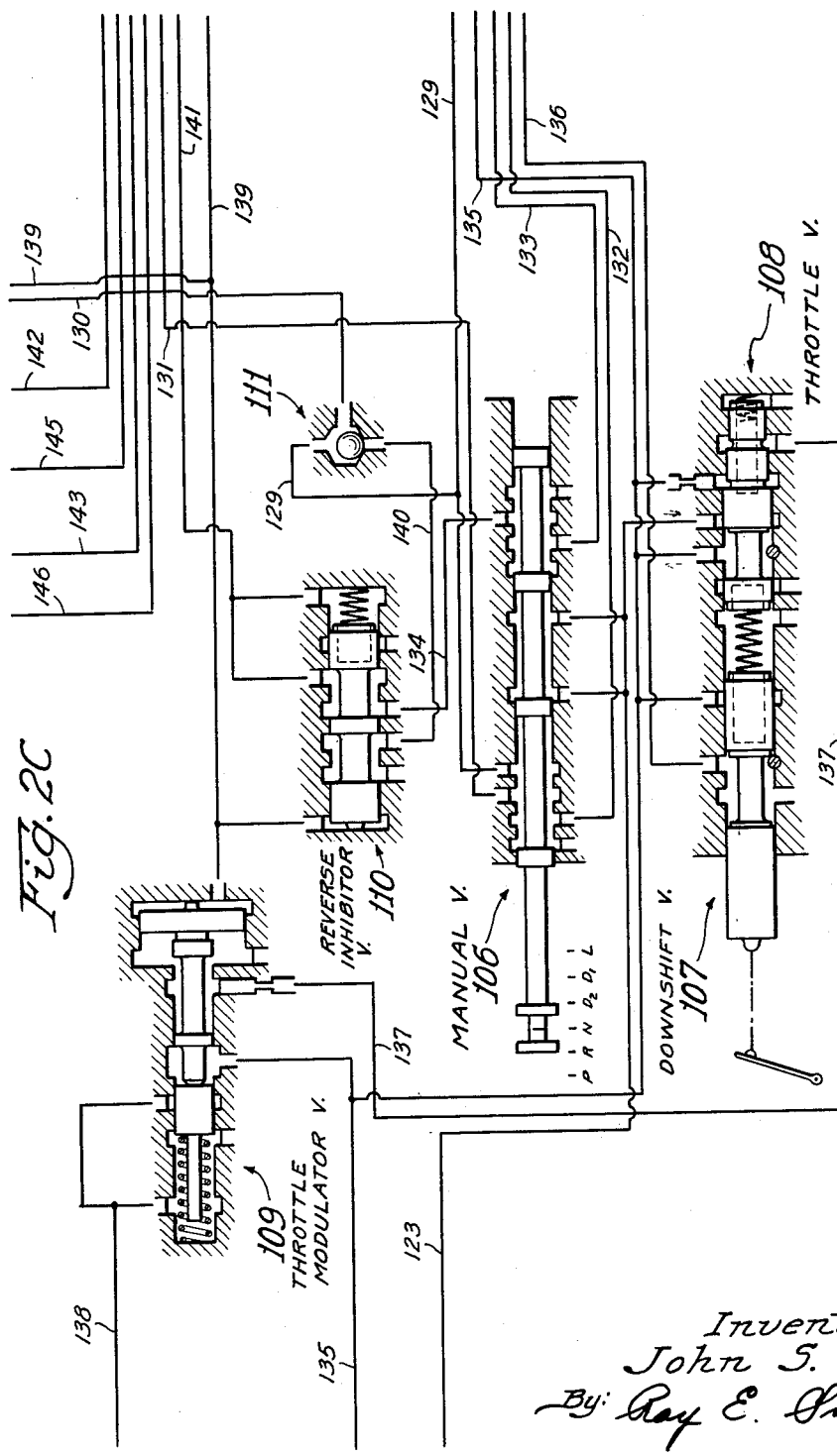

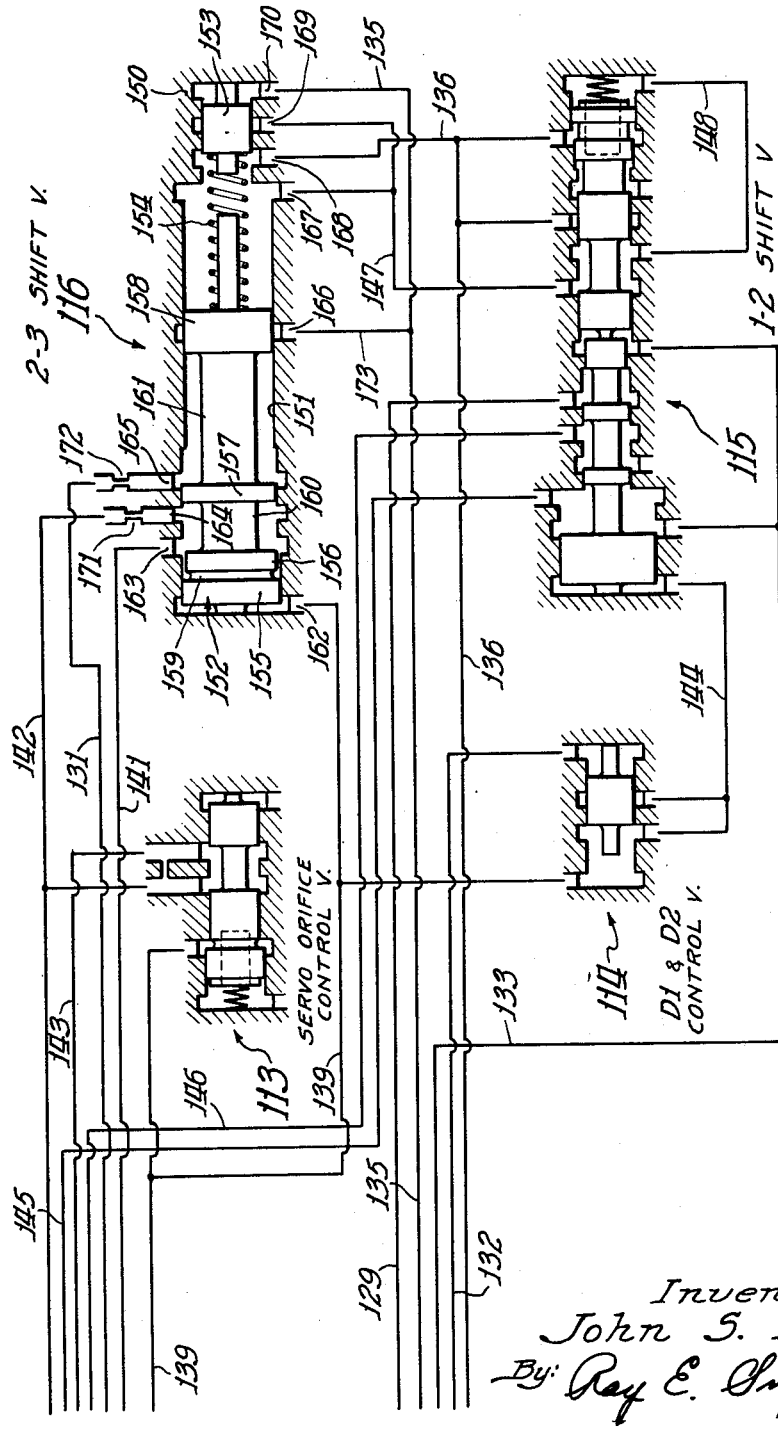

United States Patent Office 3,136,175
Patented June 9, 1964

3,136,175
TRANSMISSION CONTROLS
John S. Ivey, Muncie, Ind., assignor to Borg-Warner Corporation, a corporation of Illinois
Filed Sept. 18, 1961, Ser. No. 138,858
2 Claims. (Cl. 74—472)

This invention relates to a control system for an automatic transmission adapted to be used in automotive vehicles.

The present invention constitutes an improvement of the transmission control system disclosed in my co-pending applications, Serial No. 12,771 filed March 4, 1960, and Serial No. 112,645 filed May 25, 1961.

The transmission mechanism with which the control system is particularly adapted to be used includes a torque converter, a planetary gear set and a plurality of friction engaging elements operable on the gear set to provide low, intermediate, and high gear speed ratios through the transmission. The transmission mechanism also includes a one-way engaging device or overrunning brake which serves as a reaction element for the gear set for establishing low speed forward drive condition.

It has been found that in the operation of an automatic transmission of the type described that, for certain driving conditions as for example when the vehicle is coasting in high speed forward drive, the engine may be driving the vehicle, but when a downshift to intermediate occurs, the vehicle may drive the engine resulting in a clunk or bump in the transmission. In down-shifting into low speed forward drive, however, the one-way brake overruns in a coasting condition and there is no effect of engine braking due to the vehicle driving the engine.

It is an object of the present invention to provide a control system for an automatic transmission of the type described wherein for a coasting, closed throttle condition, the transmission is shifted directly from high speed forward drive into low without passing through the intermediate range, thereby eliminating the clunk or lurch due to the engagement of the friction elements which cause the vehicle to drive the engine.

For certain other driving conditions, it is desirable to shift from third into second particularly for passing or when the vehicle is under load. In the present invention, manual control is provided by means of the throttle actuator which tends to cause the transmission to shift from high to intermediate for either partly open or wide-open throttle condition. The down-shift from high directly into low occurs only for the closed throttle condition.

It is therefore another object to provide an improved control system for an automatic transmission in which the control system is designed to be responsive to throttle actuator position so that a down-shift from high speed ratio to low speed ratio occurs for normal closed throttle operation and a down-shift from high to intermediate occurs for part throttle or wide-open throttle condition.

It is still another object to provide a hydraulic control system of the type described in which is provided a regulated line pressure, governor pressure, and throttle pressure and a 2–3 shift valve for effectuating the up-shift and down-shift from intermediate to high speed forward drive and which is responsive to vehicle speed as determined by governor pressure and to throttle actuator position as determined by throttle pressure, the 2–3 shift valve comprising a two-position valve piston formed with differential land areas, one such differential area being responsive to line pressure in one position for tending to inhibit up-shift and the same differential land area being responsive to throttle pressure in a second position for effectuating or tending to effectuate a down-shift.

The invention consists of the novel constructions, arrangements, and devices to be hereinafter described and claimed for carrying out the above-stated objects and such other objects as will appear from the following description of a preferred form of the invention, illustrated with reference to the accompanying drawings, wherein:

FIGURE 1 is an over all schematic view of the hydraulic control system of the present invention; and FIGURE 2 is a layout diagram of FIGURES 2A, 2B, 2C and 2D which disclose the control system in greater detail.

The transmission mechanism with which the present control system is adapted to be used is shown schematically in FIGURE 2A and is more partitcularly described in my co-pending application Serial Number 12,771. The transmission mechanism is designated generally by the numeral 10 and comprises an input shaft 11 and an output shaft 12, a first intermediate shaft 13, and a second intermediate shaft 14, all coaxially aligned. In addition, the transmission 10 comprises a fluid torque converter 15, a planetary gear set 16, a front clutch 17, a rear clutch 18, a front brake 19, a rear brake 20, and a one-way brake 21.

The torque converter 15 comprises a driving element or impeller 22, a driven element or turbine 23, and a reaction element or stator 24. The impeller 22 is connected to be driven by the drive shaft 11; the turbine 23 is connected to the first intermediate shaft 13; and the stator 24 is connected through a one-way brake 25 to a transmission casing 26.

The planetary gear set 16 comprises a first sun gear 30, a second sun gear 31, a plurality of long planet gears 32, a plurality of short planet gears 33, a planet gear carrier 34, and a ring gear 35. The short planet gears 33 are in mesh with the sun gear 30 and with the long planet gears 32; and the long planet gears 32 are in mesh with the sun gear 31 and ring gear 35. The sun gear 30 is connected with the second intermediate shaft 14 and the ring gear 35 is connected to the output shaft 12.

The front clutch 17 comprises a fluid pressure servomotor 40 for engaging the clutch, an outer shell 41, an inner hub 42 and a plurality of interleaved friction discs 43. The outer shell 41 is connected to the first intermediate shaft 13 and the inner hub 42 is connected to the second intermediate shaft 14.

The rear clutch 18 comprises a fluid pressure actuated servomotor 44 for engaging the clutch, an outer shell 45 an inner hub 46, and a plurality of interleaved friction discs 47. The inner hub 46 is connected to the outer shell 41 of the clutch 17, and the outer shell 45 is connected to the second sun gear 31 of the planetary gear set 16.

The front brake 19 comprises a friction band 50, adapted to engage the outer shell 45 of the rear clutch 18 for holding the sun gear 31, and a fluid pressure actuated servomotor 51 for applying the brake 19. The servomotor 51 is divided into two cavities, an apply cavity 51a and a disapply cavity 51b, the two cavities being separated by a movable piston 52 which acts on the brake band 50.

The rear brake 20 comprises a friction band 55 adapted to engage a brake drum 56 and a fluid pressure servomotor 57 for applying the band 55. The drum 56 is connected to the planet gear carrier 34 and is effective when the brake 20 is engaged to hold the carrier 34 for certain driving gear ratios to be described hereinafter.

The one-way brake 21 is interconnected between the planet gear carrier 34 and the transmission casing 26 and is effective to hold the carrier 34 for normal low speed start.

*Mechanical Operation*

The transmission mechanism 10 provides three forward drive gear ratios and a reverse drive, and also has a neutral condition. Neutral condition is obtained when all of the brakes and clutches are disengaged.

Low speed forward drive is obtained by engagement of the clutch 17 and of the one-way brake 21. In this condition, driving torque from a driving engine (not shown) is transmited from the drive shaft 11 through the torque converter 15, the first intermediate shaft 13, the engaged clutch 17 and second intermediate shaft 14 to the sun gear 30. The one-way brake 21 holds the planet gear carrier 34 so that it serves as a reaction element for the gear set 16 and the ring gear 35 is driven by the planet gears 32 and 33 for driving the output shaft 12.

A subsequent up-shift to second or intermediate speed forward drive is obtained by engagement of the front brake 19. Torque is transmitted to the first sun gear 30 through the clutch 17 as previously described and the engaged brake 19 is effective to hold the sun gear 31 stationary so that it serves as a reaction element for the gear set 16. The one-way brake 21 overruns in this condition and the ring gear 35 is driven by the planet gears 32 and 33 for driving the output shaft 12 at an intermediate speed drive ratio.

A subsequent up-shift to high or direct forward drive is obtained by disengagement of the brake 19 and engagement of the rear clutch 18. In this condition, driving torque is supplied to the first sun gear 30 as previously described and in addition is supplied through the engaged clutch 18 to the second sun gear 31. The engaged clutches 17 and 18 effectively lock together the two sun gears 30 and 31 so that the gear set 16 rotates as a unit and a 1:1 or direct drive ratio is obtained through the transmission.

Reverse drive is obtained by disengagement of the clutch 17 and engagement of the rear clutch 18 and rear brake 20. In this condition, driving torque from the engine is transmited through the torque converter 15, the intermediate shaft 13, the outer shell 41 of the clutch 17, and through the engaged clutch 18 to the sun gear 31. The brake 20 is effective to hold the planet gear carrier 34 stationary so that it serves as a reaction element for the gear set 16. Forward driving torque supplied through the sun gear 31 is transmitted through the long planet gears 32 for driving the ring gear 35 and the output shaft 12 in the reverse direction.

A manual low speed forward drive condition is obtainable by engagement of the front clutch 17 and rear brake 20. The rear clutch 18 and front brake 19 are disengaged. In this condition, the rear brake 20 functions to hold the planet gear carrier 34 stationary so that it serves as a reaction element for the gear set 16. Low speed forward drive condition is then obtained in the same manner as when the one-way brake 21 is engaged to hold the carrier 34 stationary, except that up-shifts to higher speed ratios are not obtainable unless the manual selector lever is moved to a drive position, as will be described later.

The hydraulic control system for the transmission of FIGURE 2A is shown schematically in FIGURE 1 and is shown in detail in FIGURES 2B, 2C and 2D. The control system is designated generally by the numeral 100 and includes a front pump 101 connected to be driven by the driven shaft 12. A fluid supply reservoir or sump 103 is formed on the bottom interior of the transmission casing 26 and contains the working fluid for the control system 100.

The hydraulic control system 100 also includes the torque converter 15 and the following valves:

104, Primary regulator valve
    105, Secondary regulator valve
    106, Manual selector valve
    107, Down shift valve
    108, Throttle valve
    109, Throttle modulator valve
    110, Reverse Inhibitor valve
    111, Ball check valve
    112, Governor valve
    113, Servo orifice control valve
    114, D–1 and D–2 control valve
    115, 1–2 shift valve
    116, 2–3 shift valve Whenever the vehicle engine is running so as to drive the drive shaft 11, the front pump 101 draws fluid from the sump 103 through a suction line 120 and discharges fluid under pressure into conduit 121. Fluid in the conduit 121 is supplied to a port in the primary regulator valve 104 and is delivered through a front pump check valve 122 into a conduit 123. The conduit 123 will hereinafter be referred to as the line pressure conduit for supplying line pressure to the rest of the control system 100.

Whenever the driven shaft 12 is turning forwardly above some predetermined speed, the rear pump 102 draws fluid from the sump 103 through a conduit 124 and discharges fluid under pressure into a conduit 125. From the conduit 125 fluid passes through a rear pump check valve 126 into the line pressure conduit 123.

The primary regulator valve 104 regulates the line pressure in conduit 123 for various operative conditions of the transmission to be described hereinafter. Part of the fluid supplied to the primary regulator valve 104 is delivered into a conduit 127 for supplying the converter 15. The pressure within the converter 15 is regulated by the secondary regulator valve 105 and fluid is discharged from the converter 15 through a check valve 128 into the sump 103.

Line pressure in the conduit 123 is supplied to the manual selector valve 106 and can be directed by this valve through a plurality of conduits to various other valves and hydraulic servomotors of the transmission.

A conduit 129 is connected to the ball check valve 111 and to the 1–2 shift valve 115. The ball check valve 111 is connected to deliver fluid through a conduit 130 to the front clutch servomotor 40 and to the governor valve 112. The manual valve 106 is also connected by means of a conduit 131 to the 2–3 shift valve 116; by means of a conduit 132 to the D–1 and D–2 control valve 114; by means of a conduit 133 to the 1–2 shift valve 115; and by means of a conduit 134 to the reverse inhibitor valve 110.

The down-shift valve 107 is connected by means of a conduit 135 to the throttle valve 108, the throttle modulator valve 109, the right end of the 2–3 shift valve 116, and the left end of the primary regulator valve 104. The down-shift valve 107 is also connected by means of a conduit 136 to the 1–2 shift valve 115 and 2–3 shift valve 116.

The throttle valve 108 is connected by means of a conduit 137 to the throttle modulator valve 109, and the valve 109 is connected by means of a conduit 138 to the right end of the primary regulator valve 104. The conduit 135 will hereinafter be referred to as the throttle pressure conduit and the conduit 138 will be referred to as the throttle modulator pressure conduit.

The throttle modulator valve 109 is also connected by means of a conduit 139 to the governor valve 112, the reverse inhibitor valve 110, the servo orifice control valve 113, the D–1 and D–2 control valve 114, and the 2–3 shift valve 116. The conduit 139 is filled with fluid under pressure from the governor valve 112. The pressure in this conduit increases directly as a function of the speed of the driven shaft 12 and this pressure will hereinafter be referred to as governor pressure.

The reverse inhibitor valve 110 is connected by means of a conduit 140 to the ball check valve 111, and by means of a conduit 141 to the 2–3 shift valve 116.

The servo orifice control valve 113 is connected by means of a conduit 142 to the 2–3 shift valve 116 and to the rear clutch servo 44; and by means of a conduit 143 to the disapply cavity 51d of the front brake servomotor 51.

The D–1 and D–2 control valve 114 is connected by means of a conduit 144 to the left end of the 1–2 shift valve 115. The 1–2 shift valve 115 is also connected by means of a conduit 145 to the rear brake servo 57; by means of a conduit 146 to the apply cavity 51a of the front brake servo 51; and by means of a conduit 147 to the 2–3 shift valve 116. The 1–2 shift valve 115 also has a conduit or channel 148 interconnecting two ports on the same bore.

The structure and operation of the control system of my earlier applications Serial Nos. 12,771 and 112,645 have been described in some detail in those applications. The description of the present control system will be directed only to the improvements of that control system.

The 2–3 shift valve 116 comprises a casing portion 150 formed with a stepped longitudinal cylindrical bore 151, a valve piston 152, a valve plug 153, and a spring 154, disposed under compression between the valve piston 152 and plug 153. The valve piston 152 is formed with lands 155, 156, 157 and 158, and annular grooves 159, 160 and 161 between the lands. The land 155 of the valve piston 152 is of a slightly larger diameter than the lands 156 and 157, which are of the same diameter; and the land 158 is of a slightly smaller diameter than the land 157.

The casing portion 150 is formed with ports 162, 163, 164, and 170. Ports 162 is connected to governor pressure conduit 139; port 163 is connected to conduit 141; port 164 is connected through a restriction 171 to conduit 142; port 165 is connected through a restriction 172 to conduit 131; ports 167 and 169 are connected to conduit 147; port 168 is connected to conduit 136; and port 170 is connected to the throttle pressure conduit 135.

In my earlier application, Serial No. 12,771, the port 166 was open to the sump 103. In the present embodiment, however, the port is connected by means of a branch conduit 173 to the throttle pressure conduit 135.

Operation

Governor pressure is supplied from conduit 139 through port 162 and acts against the left face of land 155 of the valve piston 152, tending to move it toward an up shifted position. The movement of the valve piston 152 to an up shifted position is inhibited by three forces. First, line pressure supplied from conduit 131 through port 165 into groove 161 acts on the differential area of the lands 157 and 158 and tends to force the valve piston 152 toward the left, as shown; second, the spring 154 tends to force the valve piston 152 to the left; and third, throttle pressure supplied from conduit 135 through port 170 tends to force the plug 153 to the left permitting throttle pressure fluid to enter port 169 and conduit 147 and back through port 167 into the bore 151. The pressure admitted through port 167 is reduced or regulated by the plug 153 and spring 154 and this pressure acting on the right face of the land 158 tends to force the valve piston 152 toward the down-shifted position.

At some stage of operation, governor pressure will be sufficient to overcome the three forces just described and will force the valve piston 152 towards the right into the up shift position. In this latter position, line pressure fluid supplied from conduit 131 no longer is supplied to the groove 161 and now flows from port 165 through the groove 160 between lands 156 and 157 and through port 164 and conduit 142 to the rear clutch servomotor 44 and through the servo orifice control valve 113 and conduit 143 to the disapply cavity 51b of the front brake servomotor 51.

In my earlier application, the up-shifting of the valve piston 152 forced the plug 153 to the right, where it blocked the port 169 and cut off the passage of fluid pressure through port 167. This insured that an up-shift and down-shift to the valve piston 152 did not occur at the same point and thereby eliminated hunting or oscillation of the valve piston 152.

In the present embodiment, however, the valve plug 153 and spring 154 continue to regulate pressure and permit fluid to pass through ports 169 and 167 and this reduced pressure acts on the right face of the land 158 tending to cause a down-shift. In addition, whenever the throttle is partly or fully open, throttle pressure is supplied from conduit 135 and branch conduit 173 through port 166 into the groove 161 between the lands 157 and 158 where it acts on the differential area of the lands and tends to force the valve piston 152 toward the left into a down-shifted condition. Since throttle pressure is always less than line pressure, hunting of the piston 152 is prevented by the difference in pressures acting on the differential area of lands 157 and 158.

Under closed throttle condition, throttle pressure in conduit 135 is zero or at least negligible so the only force tending to produce a down-shift is that caused by the spring 154. When the governor pressure supplied from conduit 139 drops sufficiently with decreasing vehicle speed, at some stage the force due to governor pressure acting on the left face of land 155 is exceeded by the force of the spring 154 and the valve piston 152 is moved to the down-shifted position. The diameters of the lands of the piston 152 and the spring rate of the spring 154 are predetermined so as to cause the valve piston 152 to move to a down-shifted position under a closed throttle condition only after the 1–2 shift valve 115 has moved to a down-shifted condition, thereby causing the transmission to shift from high or third speed forward drive directly into low or first speed forward drive without passing through the intermediate or second speed drive. Since the one-way brake 21 overruns on a coasting condition and since it can re-engage without an overlap when a drive condition is reestablished, there is no bump or lurch produced in causing the three to one down-shift.

For certain driving conditions, however, it is desirable to shift from third or high speed forward drive to intermediate or second speed forward drive. This is accomplished during part throttle or full throttle condition by virtue of throttle pressure supplied from conduit 135. Throttle pressure acting on the differential area of lands 157 and 158, together with the reduced throttle pressure acting on the right face of the land 158, tend to force the valve piston 152 to the down-shift position. When the combined forces due to throttle pressure and reduced throttle pressure and the force of the spring 154 exceeds the force due to governor pressure, the valve piston 152 is moved downwardly and second speed forward drive is established before the 1–2 shift valve 115 moves down to establish first speed forward drive. The throttle pressure in conduit 135 is directly responsive and proportional to the amount of depression of the vehicle throttle actuator.

It is to be understood that the invention is not to be limited to the specific constructions and arrangements shown and described, except only insofar as the claims may be so limited, as it will be understood to those skilled in the art that changes may be made without departing from the principles of the invention.

I claim:

1. In a transmission for an automotive vehicle having a driving engine provided with a throttle and a throttle actuator, the combination of a drive shaft adapted to be driven by the vehicle engine, a driven shaft, gearing interconnecting said shafts and arranged to selectively provide low, intermediate, and high speed power trains between said shafts, a one-way brake engageable to establish said low speed power train, a fluid pressure operated friction device engageable to establish said intermediate speed power train, a second fluid pressure operated friction device engageable to establish said high speed power train, a servomotor for each of said friction devices, a source of fluid pressure, a throttle valve connected to said source and to the throttle actuator for providing a pressure that varies directly with the throttle actuator position, a hydraulic governor connected to said source of pressure and driven by said driven shaft and providing a governor output pressure that increases with driven shaft speed, first and second shift valves connected between said source and said servomotors and each having end portions, passage means directing fluid pressure from said throttle valve and said hydraulic governor to opposite end portions of the respective shift valves to apply fluid pressure on one end portion of said shift valves which is responsive to the position of the throttle actuator and fluid pressure responsive to the speed of the vehicle on the other end portion thereof to cause automatic upshifting of the transmission from low speed to intermediate speed to high speed, said second shift valve having one position connecting said source of fluid pressure to the servomotor for said second friction device to establish said high speed drive ratio and an other position interrupting the connection to the servomotor for said second friction device, said second shift valve having two lands of different diameter thereon defining a differential area, said differential area being in fluid contact with the fluid pressure responsive to the throttle valve when said second shift valve is in said one position and in fluid contact with said source of fluid pressure when said second shift valve is in said other position to provide automatic downshifting of high speed to intermediate speed to low speed when the throttle valve is in an open position and permitting automatic downshifting of high speed directly to low speed when the throttle valve is in its closed position.

2. In a transmission for an automotive vehicle having a driving engine provided with a throttle and a throttle actuator, the combination of a drive shaft adapted to be driven by the vehicle engine, a driven shaft, gearing interconnecting said shafts and arranged to selectively provide low, intermediate, and high speed power trains between said shafts, a one-way brake engageable to establish said low speed power train, a first fluid pressure operated friction device engageable to establish said intermediate speed power train, a second fluid pressure operated friction device engageable to establish said high speed power train, a servomotor for each of said friction devices, a source of fluid pressure, a throttle valve connected to said source and to the throttle actuator for providing a pressure that varies directly with the throttle actuator position, a hydraulic governor connected to said source of pressure and driven by said driven shaft and providing a governor output pressure that increases with driven shaft speed, first and second shift valves connected between said source and said servomotors and each having end portions, passage means directing fluid pressure from said throttle valve and said hydraulic governor to opposite end portions of the respective shift valves to apply fluid pressure on one end portion of said shift valves which is responsive to the position of the throttle actuator and fluid pressure responsive to the speed of the vehicle on the other end portion thereof to cause automatic upshifting of the transmission from low speed to intermediate speed to high speed, each of said shift valves having an upshifted and a downshifted position, said one-way brake being engaged to establish said low speed power train when said shift valves are each in the downshifted position, said first friction device being engaged to establish said intermediate speed power train when said first shift valve is in the upshifted position and said second shift valve is in the downshifted position, said second friction device being engaged to establish said high speed power train when both said shift valves are in the upshifted position, said end portions of said shift valves being constructed to enable said first shift valve to move from the upshifted to the downshifted position before said second shift valve moves from the upshifted to the downshifted position to provide automatic downshifting from high speed directly to low speed when the throttle valve is in its closed position, said second shift valve having two lands of different diameter thereon defining a differential area, said differential area being in fluid contact with the fluid pressure responsive to the throttle actuator position when said second shift valve is in the upshifted position and serving to urge said second shift valve to the downshifted position when the throttle valve is in an open position to provide automatic downshifting from high speed to intermediate speed to low speed.

References Cited in the file of this patent

UNITED STATES PATENTS

| | | |
|---|---|---|
| 2,950,629 | Holdeman et al. | Aug. 30, 1960 |
| 2,971,405 | Flinn | Feb. 14, 1961 |
| 3,000,230 | Froslie | Sept. 19, 1961 |
| 3,006,213 | Wilson | Oct. 31, 1961 |